United States Patent
Maruko et al.

(10) Patent No.: US 9,065,607 B2
(45) Date of Patent: Jun. 23, 2015

(54) CLOCK DATA RECOVERY CIRCUIT, DATA RECEPTION APPARATUS, AND DATA TRANSMISSION AND RECEPTION SYSTEM

(71) Applicant: Sony Corporation, Tokyo (JP)

(72) Inventors: Kenichi Maruko, Kanagawa (JP); Yosuke Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/084,960

(22) Filed: Nov. 20, 2013

(65) Prior Publication Data
US 2014/0177771 A1 Jun. 26, 2014

(30) Foreign Application Priority Data
Dec. 20, 2012 (JP) .................................. 2012-277624

(51) Int. Cl.
*H03D 3/24* (2006.01)
*H04L 7/00* (2006.01)
*H04L 7/033* (2006.01)

(52) U.S. Cl.
CPC ............ *H04L 7/0037* (2013.01); *H04L 7/0041* (2013.01); *H04L 7/0337* (2013.01)

(58) Field of Classification Search
None
See application file for complete search history.

(56) References Cited

U.S. PATENT DOCUMENTS

| | | | |
|---|---|---|---|
| 2005/0286643 A1* | 12/2005 | Ozawa et al. | 375/242 |
| 2011/0175648 A1* | 7/2011 | Usugi et al. | 327/7 |

FOREIGN PATENT DOCUMENTS

JP 08-237240 9/1996

* cited by examiner

*Primary Examiner* — Adolf Dsouza
(74) *Attorney, Agent, or Firm* — Fishman Stewart Yamaguchi PLLC

(57) ABSTRACT

A clock data recovery circuit includes: an oscillator that outputs a clock signal; a phase comparator that outputs a signal corresponding to a phase difference between an input reception data signal and the clock signal; a divider that outputs a feedback clock signal; a first variable delay circuit that outputs a delay data signal; a second variable delay circuit that outputs a delay feedback clock signal; a frequency phase comparator that outputs a signal corresponding to a frequency difference and a phase difference between the delay data signal and the delay feedback clock signal; a lock detector that outputs a determination signal indicating whether or not the frequency difference and the phase difference are within a predetermined range; and a multiplexer that receives the determination signal and select a signal of the phase comparator and a signal of the frequency phase comparator.

12 Claims, 10 Drawing Sheets

CLOCK DATA RECOVERY CIRCUIT, DATA RECEPTION APPARATUS, AND DATA TRANSMISSION AND RECEPTION SYSTEM

CROSS REFERENCE TO RELATED APPLICATIONS

This application claims the benefit of Japanese Priority Patent Application JP 2012-277624 filed Dec. 20, 2012, the entire contents of which are incorporated herein by reference.

BACKGROUND

The present disclosure relates to a clock data recovery circuit, a data reception apparatus, and a data transmission and reception system.

In the fields of information apparatus and digital apparatus in recent years, for transmitting a large volume of digital data at high speed and low cost, high-speed serial communication is widely used. A reception apparatus of the speed serial communication uses a "clock and data recovery" circuit (hereinafter, abbreviated as "CDR") to reproduce clock and data synchronized with a reception data column subjected to predetermined encoding. In order to extract a data rate of the reception data column, a transmitter transmits a predetermined clock pattern before the data column to be transmitted and the CDR is synchronized with the clock pattern, to thereby lock a clock frequency of the CDR to a predetermined frequency.

FIG. 10 is a block diagram of a CDR 1001 in the related art.

A reception data signal DIN is input into each of a phase comparator 102, a frequency phase comparator 104, and a lock detector 106.

The frequency phase comparator 104 compares a frequency and a phase of a feedback clock signal FBCLK obtained by dividing a clock signal VCOCLK output from a voltage control oscillator 105 by a divider 108 at a predetermined division ratio, with a frequency and a phase of a clock pattern of the reception data signal DIN, and outputs a control signal corresponding to a comparison result thereof.

The phase comparator 102 compares a phase of the clock signal VCOCLK output from the voltage control oscillator 105 with a phase of a data column or the clock pattern of the reception data signal DIN, and outputs a control signal corresponding to a comparison result thereof. Further, the phase comparator 102 outputs a reproduction data signal RDATA synchronized with the clock signal VCOCLK.

The lock detector 106 compares the frequency and phase of the clock signal VCOCLK with the frequency and phase of the clock pattern of the reception data signal DIN, and determines whether or not the frequency and phase of the clock signal VCOCLK approach the frequency and phase of the clock pattern of the reception data signal DIN such that a loop including the phase comparator 102, which will be described later, is in a frequency range, in other words, whether or not the lock is achieved. If the lock detector 106 detects the lock (frequency pull-in operation is completed), the lock detector 106 provides a logic signal (determination signal SEL) indicating the "lock detection" to each of multiplexers 109a and 109b Each of the multiplexers 109a and 109b receives the determination signal of the lock detector 106, and provides an output signal of the frequency phase comparator 104 or an output signal of the phase comparator 102 to a first charge pump circuit 110. The first charge pump circuit 110 receives the pulsed output signal output from the frequency phase comparator 104 or the phase comparator 102, and outputs a pulsed current signal. The current signal is integrated and converted into a voltage signal by the loop filter 111 being a low-pass filter such that an unnecessary high-frequency component is removed. After that, the voltage signal is input into the voltage control oscillator 105. The voltage control oscillator 105 oscillates a signal having a frequency corresponding to the input voltage signal. The clock signal VCOCLK output by the voltage control oscillator 105 is input into the phase comparator 102 and into the frequency phase comparator 104 and the lock detector 106 via the divider 108.

The reproduction data signal RDATA output from the phase comparator 102 and the clock signal VCOCLK output by the voltage control oscillator 105 are supplied to a deserializer 910 (see FIG. 9) at the subsequent stage.

Note that a document that discloses a technique considered to be relevant to the present disclosure is Japanese Patent Application Laid-open No. HEI 8-237240 (hereinafter, referred to as Patent Document 1). Patent Document 1 discloses technical contents of a method for generating a clock pulse, a clock pulse generator, and a clock regenerating circuit capable of automatically and easily adjusting the frequency range of a voltage controlled oscillator and avoiding erroneous synchronization irrespective of its time of generation.

SUMMARY

Along with prevalence of sophisticated information apparatuses and digital apparatuses, high speed and low power consumption are demanded in the recent market regarding the data rate of high-speed serial transmission. Those demands make the operation of the CDRs unstable.

The power-supply voltage of the advanced LSI in recent years is lower and power consumption is significantly increased or reduced due to the low-power consumption design that suppresses unnecessary power consumption as much as possible, and hence the power-supply voltage tends to be unstable. If the CDR transitions from an unlock state to a lock state in the state in which the power-supply voltage fluctuates, there is a possibility that a loop filter voltage largely changes and an oscillation frequency of the clock signal output by the voltage control oscillator largely changes with the result that the lock is performed at an erroneous frequency or the lock is released.

In view of the above-mentioned circumstances, it is desirable to provide a clock data recovery circuit, a data reception apparatus, and a data transmission and reception system that are highly resistant to the fluctuation of a power-supply voltage, avoid a false lock state and a lock-released state, and thus have stable data reception capability.

According to an embodiment of the present disclosure, there is provided a clock data recovery circuit including an oscillator configured to output a clock signal, a phase comparator configured to output a signal corresponding to a phase difference between an input reception data signal and the clock signal, and a divider configured to output a feedback clock signal obtained by dividing the clock signal by a predetermined division ratio. The clock data recovery circuit further includes a first variable delay circuit configured to output a delay data signal obtained by providing a first predetermined delay time to the reception data signal, a second variable delay circuit configured to output a delay feedback clock signal obtained by providing a second predetermined delay time to the feedback clock signal, and a frequency phase comparator configured to output a signal corresponding to a frequency difference and a phase difference between the delay data signal and the delay feedback clock signal. The clock data recovery circuit further includes a lock detector configured to output a determination signal indicating whether or not the frequency difference and the phase difference between the delay data signal and the delay feedback clock signal are within a predetermined range, and a multiplexer configured to receive the determination signal and select a signal of the phase comparator and a signal of the frequency phase comparator.

According to the embodiments of the present disclosure, it is possible to provide a clock data recovery circuit, a data reception apparatus, and a data transmission and reception system that are highly resistant to the fluctuation of a power-supply voltage, avoid a false lock state and a lock-released state, and thus have stable data reception capability.

Other problems, configurations, and effects will become apparent in view of the following description of embodiments.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described in the following order.

[First Embodiment: Entire Configuration and Operation of CDR]
[Example of Delay Circuit]
[Second Embodiment: CDR That Automatically Sets First Delay Time dT1 And Second Delay Time dT2]
[Third Embodiment: Entire Configuration and Operation of CDR]
[Fourth Embodiment: Entire Configuration of Data Transmission and Reception System]

First Embodiment

Entire Configuration and Operation of CDR

Figure 1:
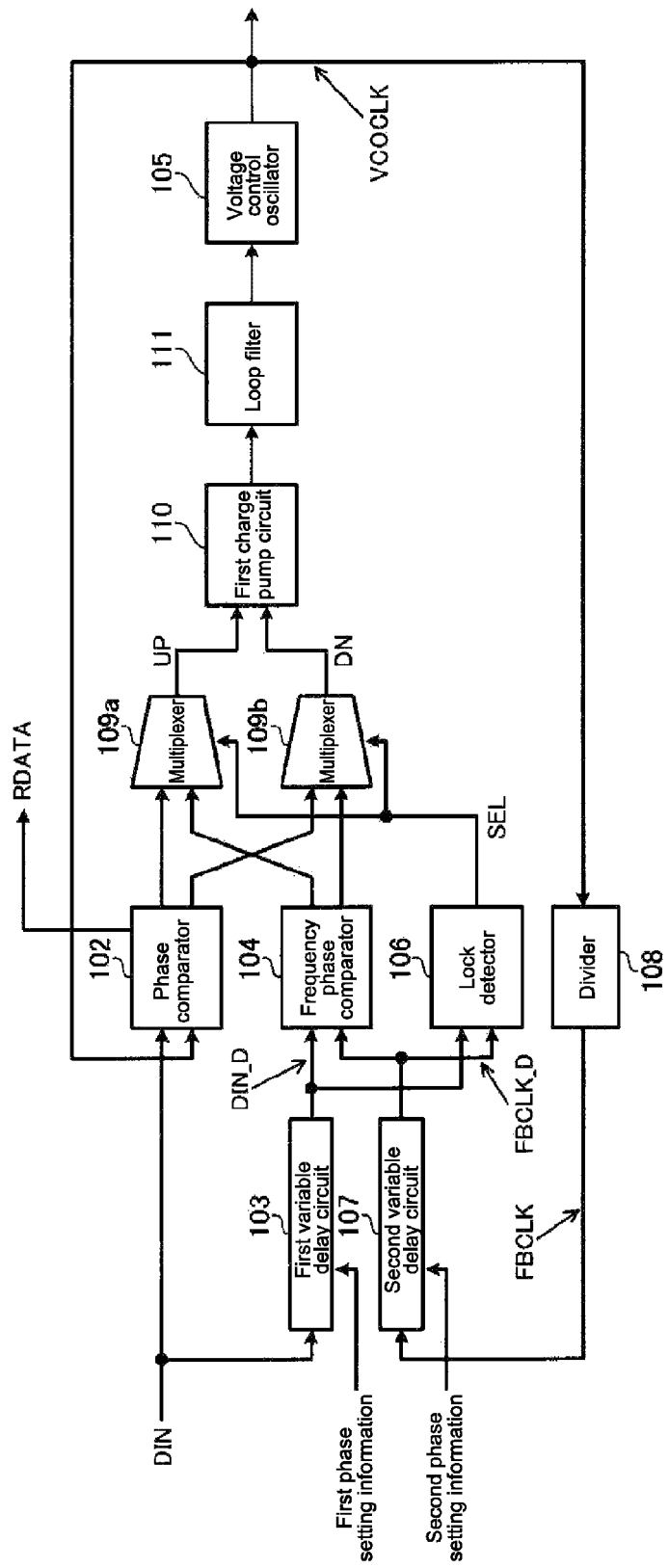
FIG. 1 is a block diagram of a CDR according to a first embodiment of the present disclosure.

FIG. 1 is a block diagram of a CDR 101 according to a first embodiment of the present disclosure.

Figure 10:
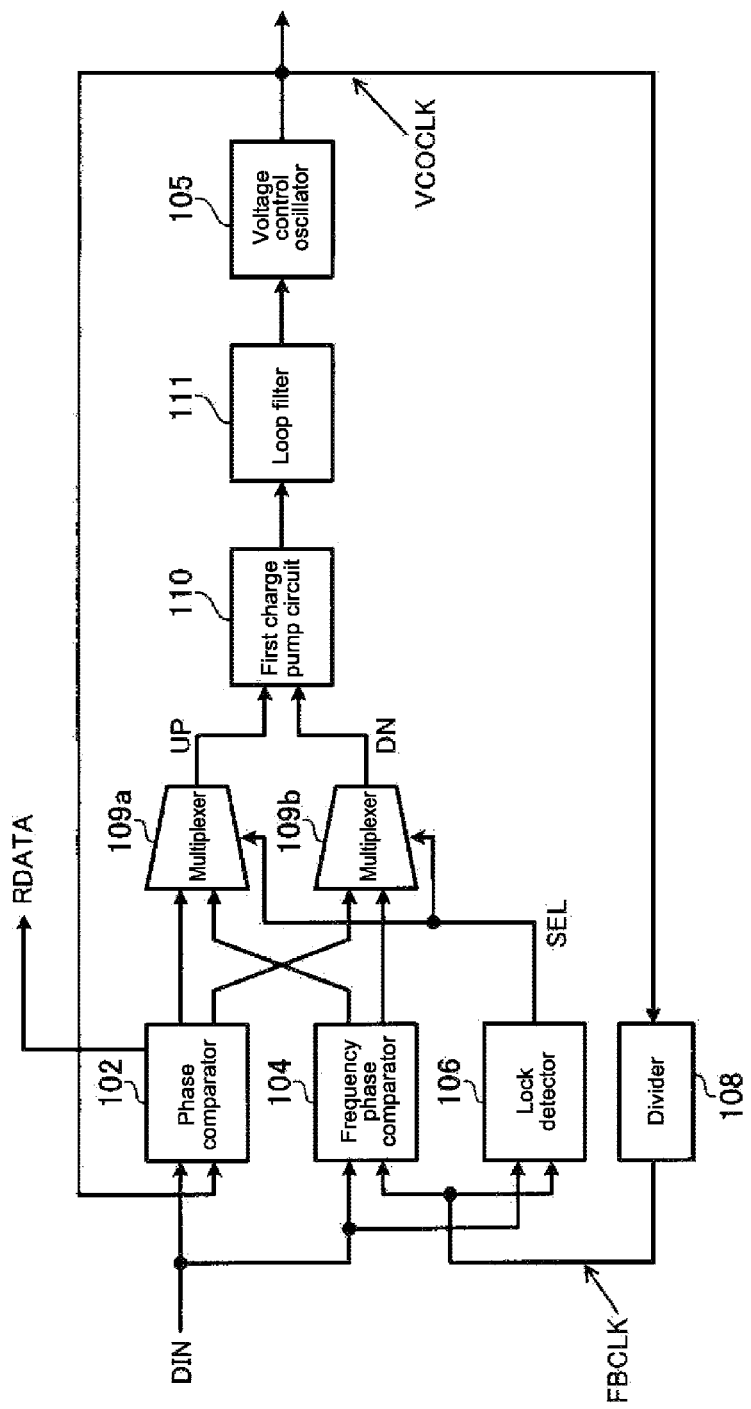
FIG. 10 is a block diagram of a CDR in the related art.

The CDR 101 according to this embodiment of the present disclosure is different from a CDR 1001 in the related art shown in FIG. 10 in that the CDR 101 includes a first variable delay circuit 103 that provides a reception data signal DIN with a first delay time dT1 and a second variable delay circuit 107 that provides a feedback clock signal FBCLK with a second delay time dT2.

The reception data signal DIN is input into each of a phase comparator 102 and the first variable delay circuit 103.

The phase comparator 102 compares a phase of a clock signal VCOCLK output from a voltage control oscillator 105 with a phase of a data column or a clock pattern of the reception data signal DIN, and outputs a control signal corresponding to a comparison result thereof. Further, the phase comparator 102 outputs a reproduction data signal RDATA synchronized with the clock signal VCOCLK.

The reproduction data signal RDATA output from the phase comparator 102 and the clock signal VCOCLK output by the voltage control oscillator 105 are supplied to a deserializer 910 at the subsequent stage.

The first variable delay circuit 103 outputs a delay data signal DIN_D obtained by providing a predetermined delay time (first delay time dT1) to the input reception data signal DIN in accordance with first phase setting information output from a section such as a ROM (not shown). The delay data signal DIN_D with the first delay time dT1 is input into each of a frequency phase comparator 104 and a lock detector 106.

The divider 108 divides the clock signal VCOCLK to a 1/N (N is natural number) frequency and outputs the feedback clock signal FBCLK.

The second variable delay circuit 107 outputs a delay feedback clock signal FBCLK_D obtained by providing a predetermined delay time (second delay time dT2) to the input feedback clock signal FBCLK in accordance with second phase setting information output from a section such as a ROM (not shown). The delay feedback clock signal FBCLK_D with the second delay time dT2 is input into each of the frequency phase comparator 104 and the lock detector 106.

The frequency phase comparator 104 compares a frequency and a phase of the delay feedback clock signal FBCLK_D with the predetermined delay time (second delay time dT2) that is output from the second variable delay circuit 107, with a frequency and a phase of a clock pattern of the delay data signal DIN_D, and outputs the control signal corresponding to a comparison result thereof.

The lock detector 106 compares the frequency and phase of the delay feedback clock signal FBCLK_D with the frequency and phase of the clock pattern of the delay data signal DIN_D. Then, the lock detector 106 determines whether or not the frequency and phase of the delay feedback clock signal FBCLK_D approach the frequency and phase of the clock pattern of the delay data signal DIN_D such that a loop including the phase comparator 102, which will be described later, is in a lockable frequency range, in other words, whether or not the lock is achieved. The lock detector 106 outputs a lock determination signal SEL to each of multiplexers 109a and 109b as a logic signal indicating whether or not the lock is detected (frequency pull-in operation is completed). The lock determination signal SEL indicates that the lock is achieved if the signal is at a logical "true" state.

Each of the multiplexers 109a and 109b receives the lock determination signal SEL and provides an output signal of the frequency phase comparator 104 or an output signal of the phase comparator 102 to a first charge pump circuit 110. The first charge pump circuit 110 receives the pulsed output signal output from the frequency phase comparator 104 or the phase comparator 102 and outputs a pulsed current signal. The current signal is integrated and converted into a voltage signal by a loop filter 111 being a low-pass filter such that an unnecessary high-frequency component is removed. After that, the voltage signal is input into the voltage control oscillator 105. The voltage control oscillator 105 oscillates a signal of a frequency corresponding to the input voltage signal. The clock signal VCOCLK output by the voltage control oscillator 105 is input into the phase comparator 102 and into the second variable delay circuit 107 via the divider 108.

The clock phase upon locking in a loop including the frequency phase comparator 104 and the clock phase upon locking in a loop including the phase comparator 102 are not necessarily the same. Due to a variation of the frequency phase comparator 104 and the lock detector 106 in a manufacturing process, a difference can occur between the clock phase upon locking in the loop including the frequency phase comparator 104 and the clock phase upon locking in the loop including the phase comparator 102.

With a stable operating environment where a power-supply voltage is stably supplied and large noises and the like are not mixed, even if there is some difference between the clock phase of the loop including the frequency phase comparator 104 and the clock phase of the loop including the phase comparator 102, the lock state is smoothly changed from the lock state of the loop including the frequency phase comparator 104 to the lock state of the loop including the phase comparator 102 without largely changing the frequency of the clock signal VCOCLK output by the voltage control oscillator 105. However, the power-supply voltage of the advanced LSI is lower and power consumption is significantly increased or reduced due to the low-power consumption design that suppresses unnecessary power consumption as much as possible, and hence it is likely that the power-supply voltage is unstable. If the CDR 101 transitions from an operating state of the loop including the frequency phase comparator 104 to an operating state of the loop including the phase comparator 102, there is a possibility that a loop filter voltage largely changes due to the difference of the clock phase immediately after the transition, and an oscillation frequency of the clock signal output by the voltage control oscillator 105 largely changes with the result that the lock is performed at an erroneous frequency or the lock is released.

For eliminating the above possibility that the lock is performed at an erroneous frequency or the lock is released, it is favorably to suppress fluctuation in clock phase as much as possible when the CDR 101 transitions from the operating state of the loop including the frequency phase comparator 104 to the operating state of the loop including the phase comparator 102. In other words, it is desirable that the clock phase upon locking in the loop including the frequency phase comparator 104 and the clock phase upon locking in the loop including the phase comparator 102 be the same.

In this embodiment, the first variable delay circuit 103 that provides the reception data signal DIN with the first delay time dT1 and the second variable delay circuit 107 that provides the feedback clock signal FBCLK with the second delay time dT2 are added to the loop of the CDR 101. With this, the difference between the clock phase upon locking in the loop including the frequency phase comparator 104 and the clock phase upon locking in the loop including the phase comparator 102 due to the variation in the manufacturing process can be overcome.

A minimum delay time is set in either one of the first variable delay circuit 103 and the second variable delay circuit 107 and a minimum delay time is set in the other one. When the delay time is set in the first variable delay circuit 103, an effect of delaying the phase of the clock signal VCOCLK with respect to the reception data signal DIN is exerted. In contrast, when the delay time is set in the second variable delay circuit 107, an effect of advancing the phase of the clock signal VCOCLK with respect to the reception data signal DIN is exerted.

Figure 2A:
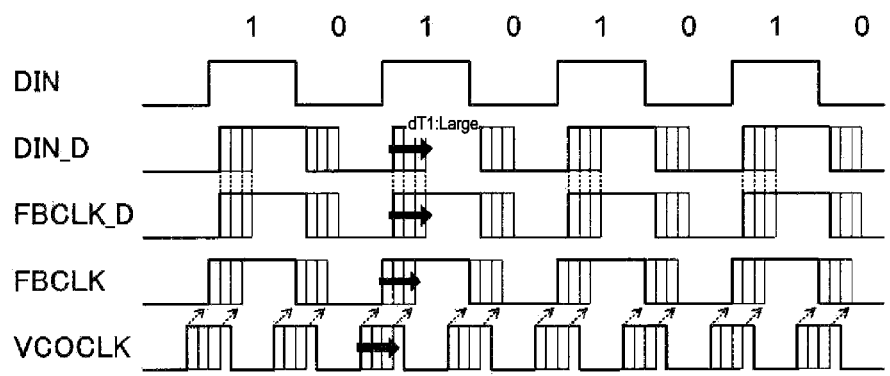
FIGS. 2A and 2B are timing charts of the CDR according to the first embodiment.
Figure 2B:
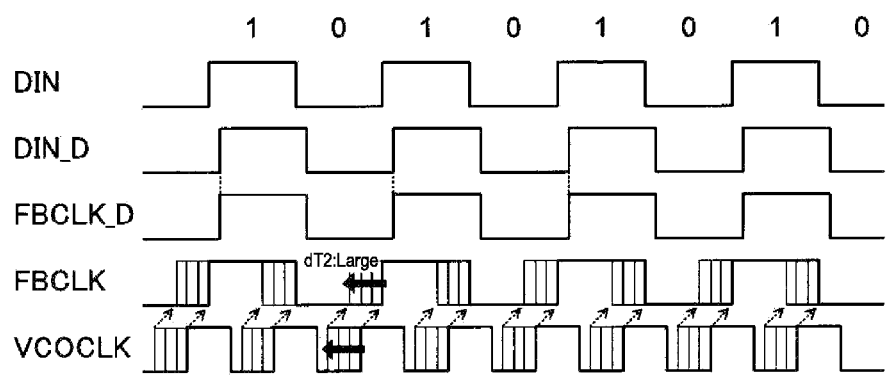

FIGS. 2A and 2B are timing charts of the CDR 101. In FIGS. 2A and 2B, it is assumed that the division ratio of the divider 108 is 2.

FIG. 2A is a timing chart when the predetermined delay time is set in the first variable delay circuit 103. At this time, the minimum delay time is set in the second variable delay circuit 107.

When a first predetermined delay time dT1 is set in the first variable delay circuit 103, the phase of the delay data signal DIN_D is delayed with respect to the reception data signal DIN. When the loop including the frequency phase comparator 104 is in the lock state, the phase of the delay feedback clock signal FBCLK_D matches that of the delay data signal DIN_D. The delay feedback clock signal FBCLK_D, which is obtained by providing the feedback clock signal FBCLK with the minimum delay time, is substantially close to the feedback clock signal FBCLK. The feedback clock signal FBCLK is output from the divider 108. In addition, the feedback clock signal FBCLK being the output signal of the divider 108 is based on the clock signal VCOCLK. Therefore, when the loop including the frequency phase comparator 104 is in the lock state, the phase of the clock signal VCOCLK with respect to the reception data signal DIN is delayed by the first delay time dT1.

Thus, the clock is synchronized with the delayed signal, and hence the phase of the clock is delayed with respect to the original signal.

FIG. 2B is a timing chart when the delay time is set in the second variable delay circuit 107. At this time, the minimum delay time is set in the first variable delay circuit 103.

When a second predetermined delay time dT2 is set in the second variable delay circuit 107, the phase of the delay feedback clock signal FBCLK_D is delayed with respect to the feedback clock signal FBCLK. When the loop including the frequency phase comparator 104 is in the lock state, the phase of the delay feedback clock signal FBCLK_D matches that of the delay data signal DIN_D. The delay feedback clock signal FBCLK_D is obtained by providing the feedback clock signal FBCLK with the second delay time dT2. The feedback clock signal FBCLK is output from the divider 108. In addition, the feedback clock signal FBCLK being the output signal of the divider 108 is based on the clock signal VCOCLK. Therefore, when the loop including the frequency phase comparator 104 is in the lock state, the phase of the clock signal VCOCLK with respect to the reception data signal DIN is advanced by the second delay time dT2.

That is, the signal is synchronized with the delayed clock, and hence the phase of the clock is advanced with respect to the original signal.

A method of adjusting the first variable delay circuit 103 and the second variable delay circuit 107 will be described.

(1) The reception data signal DIN is provided with a test signal including a predetermined clock pattern.

(2) An output of the lock detector 106 is blocked and the lock determination signal SEL is set at a logical "false" state.

(3) A first output terminal and a second output terminal of the phase comparator 102 are observed and a setting of the first variable delay circuit 103 or the second variable delay circuit 107 is adjusted such that a pulse width of a square wave output from the first output terminal and a pulse width of a square wave output from the second output terminal correspond to each other.

Figure 3A:
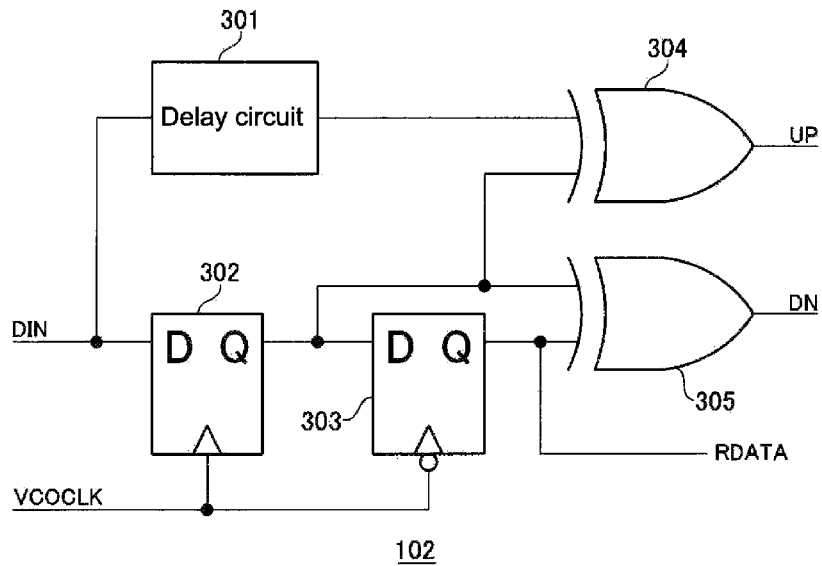
FIGS. 3A and 3B are a circuit diagram showing an example of a phase comparator and a timing chart of an output signal.
Figure 3B:
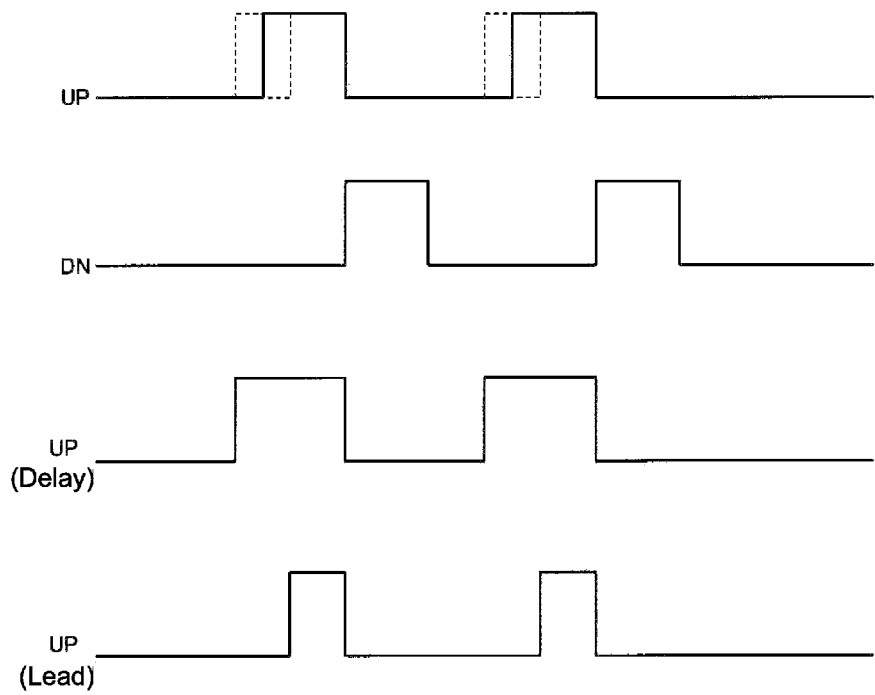

FIGS. 3A and 3B are a circuit diagram showing an example of the phase comparator 102 and a timing chart of an output signal.

FIG. 3A is a circuit diagram showing an example of the phase comparator 102.

The reception data signal DIN is input into a delay circuit 301 and into a D-terminal of a first D flip-flop 302. The clock signal VCOCLK is input into a clock terminal of the first D flip-flop 302. At the same time, the clock signal VCOCLK is logically inverted and input into a clock terminal of a second D flip-flop 303.

A Q-output signal of the first D flip-flop 302 and an output signal of the delay circuit 301 are input into a first exclusive OR gate 304. An output signal of the first exclusive OR gate 304 is a signal UP for advancing the phase.

A Q-output signal of the first D flip-flop 302 and a Q-output signal of the second D flip-flop 303 are input into a second exclusive OR gate 305. An output signal of the second exclusive OR gate 305 is a signal DN for delaying the phase. Further, the Q-output signal of the second D flip-flop 303 is used as the reproduction data signal RDATA.

FIG. 3B is a timing chart of an output signal of the phase comparator 102.

When the phase of the reception data signal DIN matches the phase of the clock signal VCOCLK, a pulse width of the signal UP matches a pulse width of the signal DN.

When the phase of the clock signal VCOCLK is advanced with respect to the reception data signal DIN, the pulse width of the signal UP becomes narrower than the pulse width of the signal DN.

When the phase of the clock signal VCOCLK is delayed with respect to the reception data signal DIN, the pulse width of the signal UP becomes wider than the pulse width of the signal DN.

In this manner, the phase difference between the reception data signal DIN and the clock signal VCOCLK is output as a difference in the pulse width between the signal UP and the signal DN output by the phase comparator 102. Therefore, in order to adjust the first variable delay circuit 103 and the second variable delay circuit 107, setting of the first variable delay circuit 103 or the second variable delay circuit 107 only needs to be adjusted such that the signal UP and the signal DN of the phase comparator 102 have the same pulse width in a state in which the loop including the frequency phase comparator 104 is operated.

The adjustment of the first variable delay circuit 103 or the second variable delay circuit 107 only needs to be performed at a final stage for manufacturing an apparatus incorporating the CDR 101 according to this embodiment. Once the adjustment is completed, the first delay time dT1 and the second delay time dT2 determined in the adjustment process are written in a non-volatile storage unit such as the ROM.

[Example of Delay Circuit]

Figure 4A:
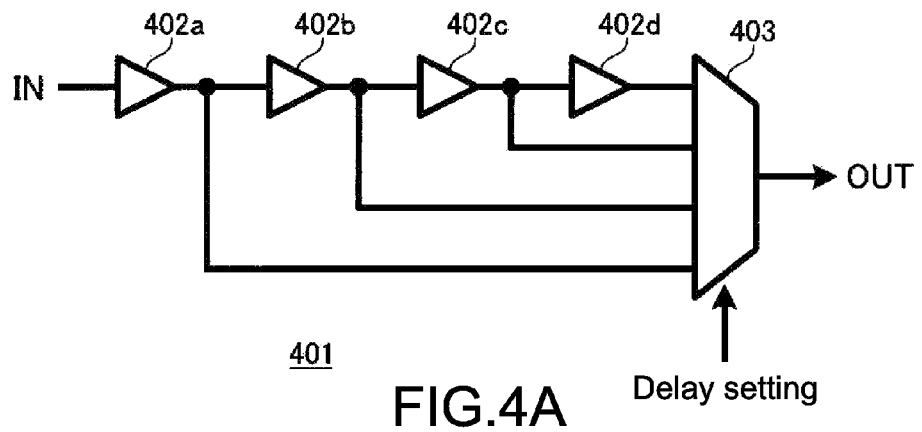
FIGS. 4A and 4B are circuit diagrams each showing an example of a delay circuit.
Figure 4B:
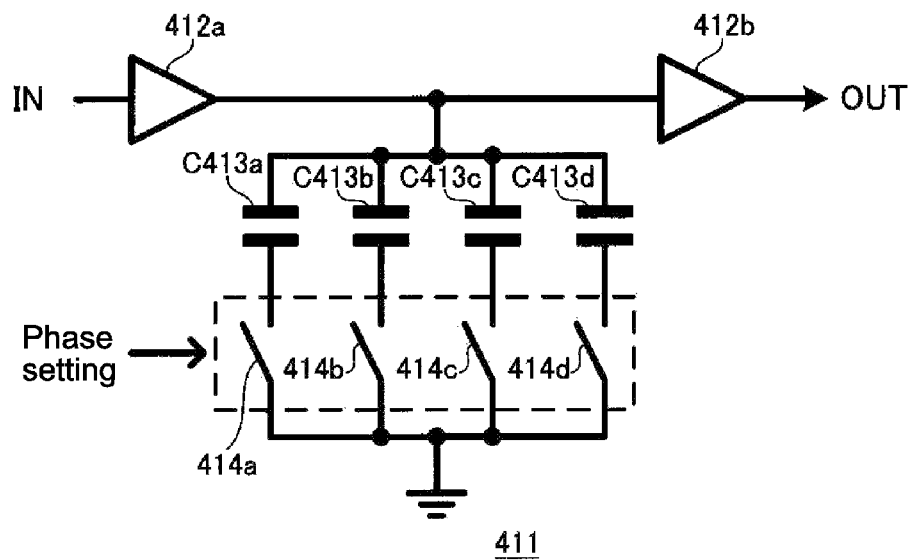

FIGS. 4A and 4B are circuit diagrams showing an example of the delay circuit.

Although the first variable delay circuit 103 and the second variable delay circuit 107 are not necessarily the same delay circuits, it is desirable to design the first variable delay circuit 103 and the second variable delay circuit 107 such that the same delay time can be set. For this purpose, it is desirable that the first variable delay circuit 103 and the second variable delay circuit 107 have the same circuit configuration.

FIG. 4A shows an example of the delay circuit. In a delay circuit 401, gate circuits 402a, 402b, 402c, and 402d are connected in series, and the delay time is set by selecting a tap based on delay setting in the multiplexer 403.

In many cases, the gate circuits 402a, 402b, 402c, and 402d include metal-oxide semiconductor field-effect transistors (MOSFETs). Each of the MOSFETs intrinsically includes capacitors between the gate and source and between the gate and drain. Thus, turning on the source and drain means powering the capacitor. When electric charges are stored in the capacitor, a delay time occurs.

FIG. 4B shows another example of the delay circuit. In a delay circuit 411, capacitors C413a, C413b, C413c, and C413d are connected in parallel between two gate circuits 412a and 412b. The delay circuit 411 turns on/off between the capacitors C413a, C413b, C413c, and C413d and a ground node through switches 414a, 414b, 414c, and 414d, to thereby set the delay time.

If the capacitors C413a, C413b, C413c, and C413d are used, it is possible to increase or reduce the combined capacitance of the capacitors, and thus, the delay time, for example, by setting the capacitance ratio of the capacitors to "1:2:4:8" according to a binary weighting.

Second Embodiment

CDR 501 that Automatically Sets First Delay Time dT1 and Second Delay Time dT2

The above-mentioned first embodiment needs the adjustment process. The adjustment process itself is not difficult. Nevertheless, the adjustment process needs human hands, which affects a product manufacturing cost. However, the adjustment process can be omitted by adding a simple circuit to be described later.

Figure 5:
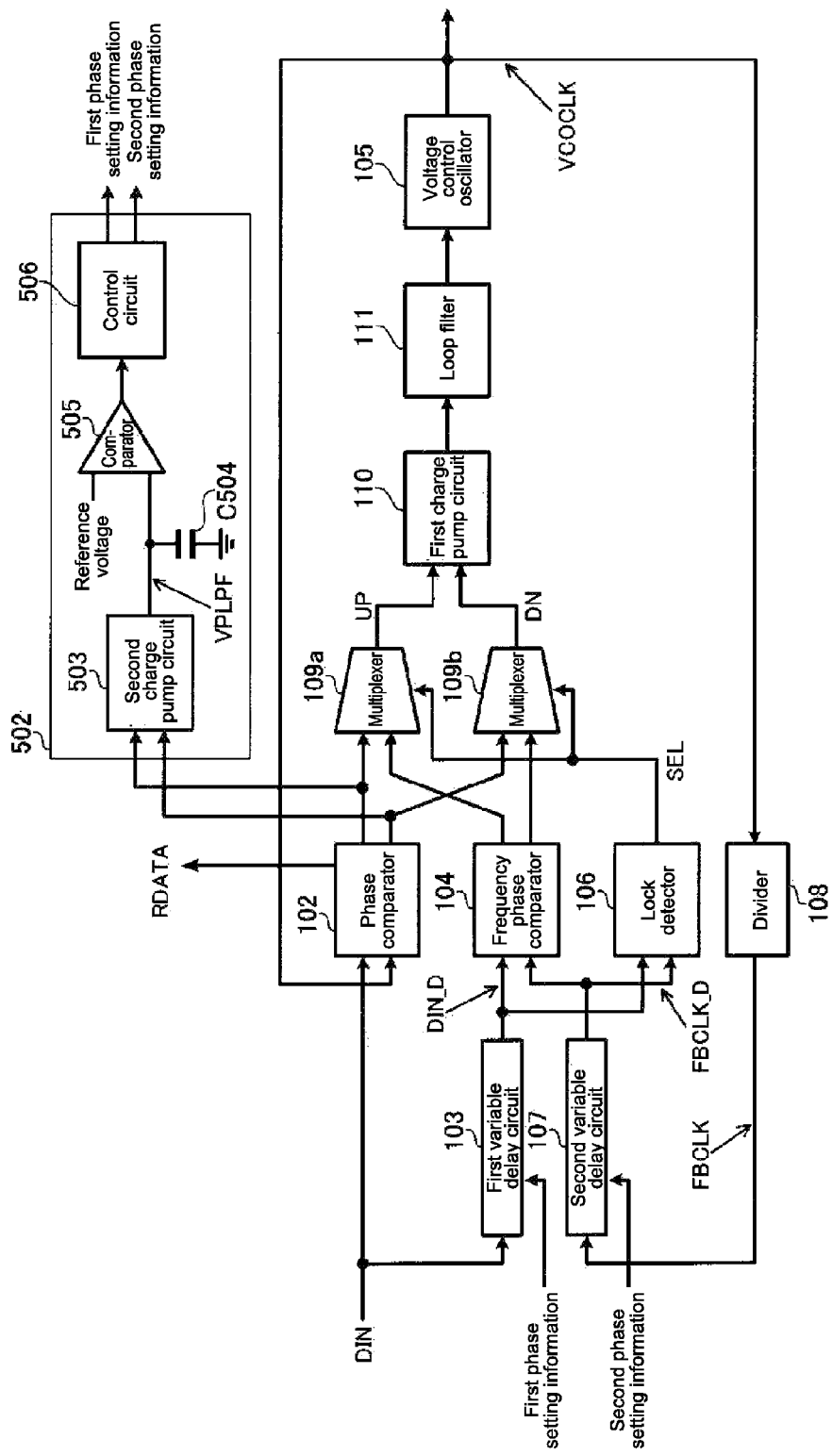
FIG. 5 is a block diagram of a CDR according to a second embodiment of the present disclosure.

FIG. 5 is a block diagram of a CDR 501 according to the second embodiment of the present disclosure. The CDR 501 shown in FIG. 5 is different from the CDR 101 shown in FIG. 1 in that a phase setting circuit 502 is added. The phase setting circuit 502 automates the above-mentioned adjustment process.

A first output terminal (signal UP) and a second output terminal (signal DN) of a phase comparator 102 are connected to a second charge pump circuit 503. Similar to a first charge pump circuit 110, the second charge pump circuit 503 receives a pulsed output signal output from the phase comparator 102 and outputs a pulsed current signal. The current signal is integrated and converted into a voltage signal by a capacitor C504 and an unnecessary high-frequency component is removed. After that, the voltage signal is input into a comparator 505.

The comparator 505 compares the output signal of the second charge pump circuit 503 with a reference voltage and outputs a binary logic signal. The logic signal is input into a control circuit 506.

The control circuit 506 receives the logic signal and controls first delay times dT1 and dT2.

Figure 6:
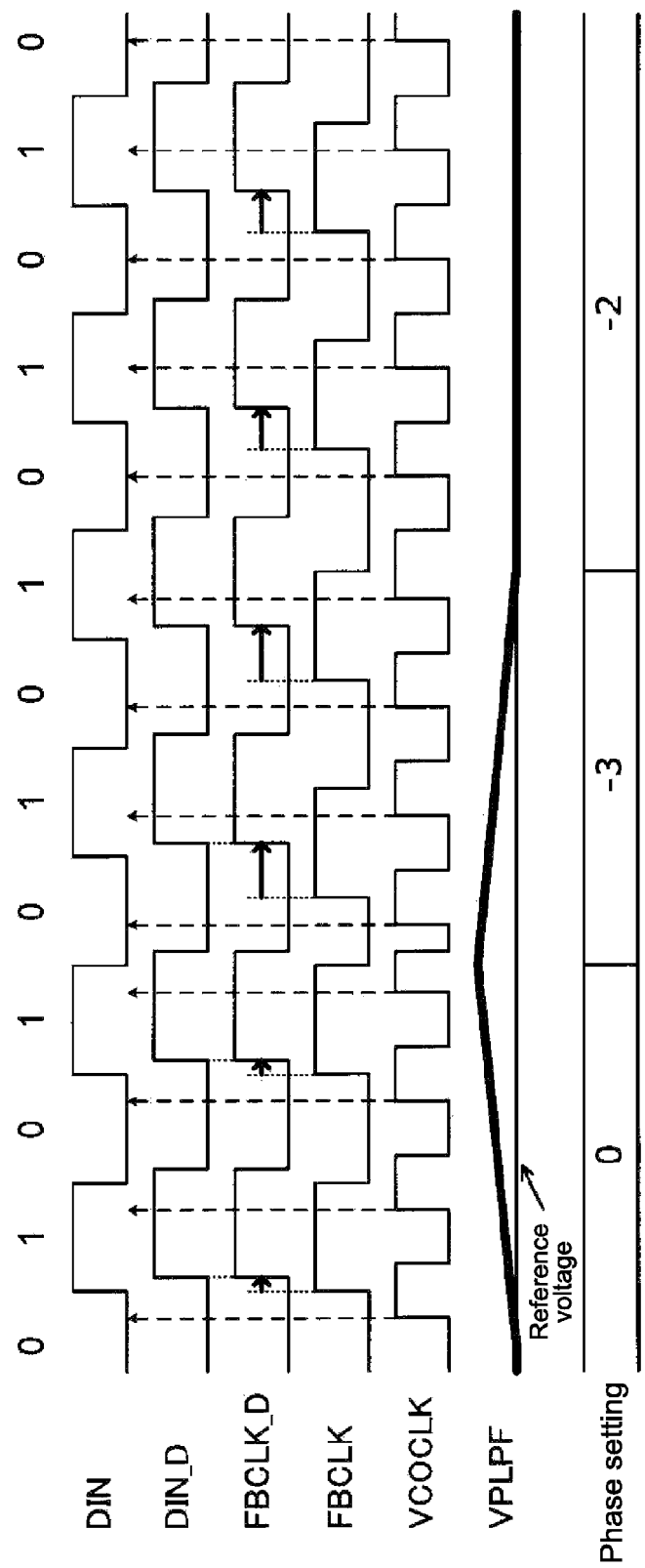
FIG. 6 is a timing chart of the CDR including a phase setting circuit according to the second embodiment of the present disclosure.

FIG. 6 is a timing chart of the CDR 501 including the phase setting circuit 502. FIG. 6 shows a state in which a delay setting value of a second variable delay circuit 107 is changed and the phase setting inside the control circuit 506 is finally set to "−2" (delay setting value of second variable delay circuit 107 is set to "2").

First, the phase setting stored inside the control circuit 506 is "0" and the phase of a reception data signal DIN is advanced with respect to a clock signal VCOCLK. A voltage of a phase difference detection signal VPLPF output from the second charge pump circuit 503, smoothed by the capacitor C504, and input into the comparator 505 gradually rises.

Next, the control circuit 506 sets the phase setting to "−3" based on the logic signal of the comparator 505. Then, a voltage of the phase difference detection signal VPLPF that is output from the second charge pump circuit 503, smoothed by the capacitor C504, and input into the comparator 505 is gradually lowered.

Next, the control circuit 506 sets the phase setting to "−2" based on the logic signal of the comparator 505. Then, a voltage of the phase difference detection signal VPLPF that is output from the second charge pump circuit 503, smoothed by the capacitor C504, and input into the comparator 505 converges to almost the same voltage as the reference voltage.

By incorporating the phase setting circuit 502, the CDR 501 according to this embodiment can omit the adjustment process of a first variable delay circuit 103 and the second variable delay circuit 107 at the manufacturing process. When an electronic apparatus incorporating the CDR 501 according to this embodiment is activated or when the electronic apparatus is connected to another electronic apparatus via a serial interface, the phase setting circuit 502 is activated to perform phase adjustment at a stage before transition to the lock state, and a stable lock state can be realized.

Third Embodiment

Entire Configuration and Operation of CDR 101

A position at which the first variable delay circuit 103 and the second variable delay circuit 107 are inserted into the CDR 101 can, at least in principle, be in the loop including the phase comparator 102.

Figure 7:
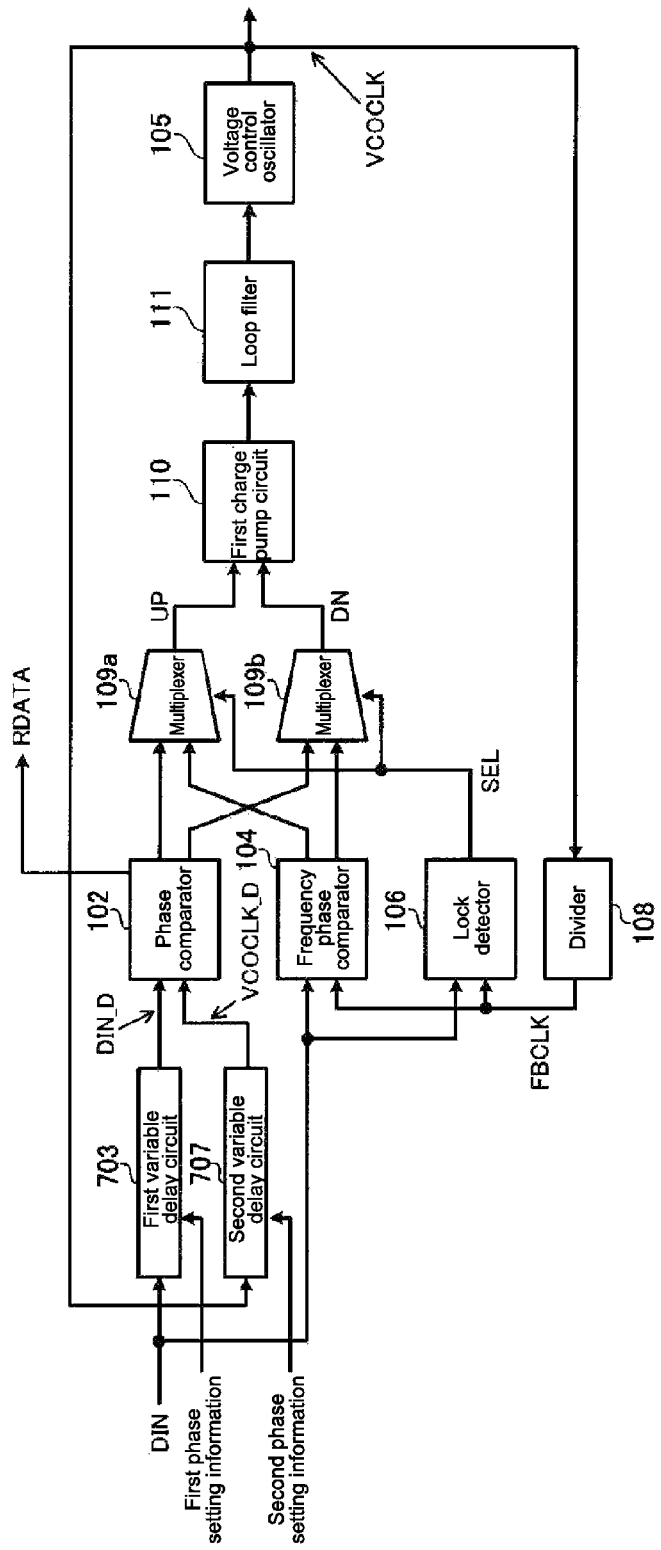
FIG. 7 is a block diagram of a CDR according to a third embodiment of the present disclosure.

FIG. 7 is a block diagram of a CDR 701 according to a third embodiment of the present disclosure. The CDR 701 shown in FIG. 7 is different from the CDR 101 shown in FIG. 1 in that a first variable delay circuit 703 and a second variable delay circuit 707 are provided just before a phase comparator 102.

Figure 8A:
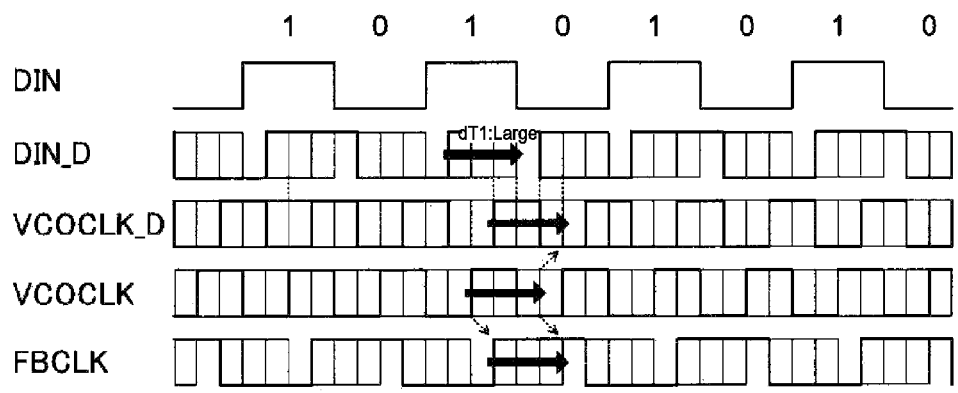
FIGS. 8A and 8B are timing charts of the CDR according to the third embodiment of the present disclosure.
Figure 8B:
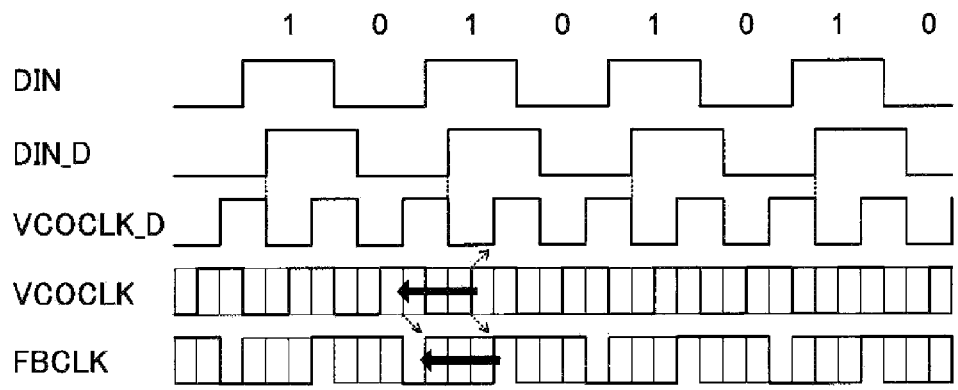

FIGS. 8A and 8B are timing charts of the CDR 701 according to the third embodiment of the present disclosure. In FIGS. 8A and 8B, the division ratio of a divider 108 is 2.

FIG. 8A is a timing chart when a predetermined delay time is set to the first variable delay circuit 703. At this time, the minimum delay time is set in the second variable delay circuit 707.

When the first predetermined delay time dT1 is set in the first variable delay circuit 703, a phase of a delay data signal DIN_D is delayed with respect to a reception data signal DIN. When the loop including the phase comparator 102 is in the lock state, a phase of a delay clock signal VCOCLK_D matches the delay data signal DIN_D. The delay clock signal VCOCLK_D, which is obtained by providing a feedback clock signal FBCLK with a minimum delay time, is substantially close to the feedback clock signal FBCLK. The feedback clock signal FBCLK is output from the divider 108. In addition, the feedback clock signal FBCLK being the output signal of the divider 108 is based on a clock signal VCOCLK. Therefore, when the loop including the phase comparator 102 is in the lock state, the phase of the clock signal VCOCLK with respect to the reception data signal DIN is delayed by a first delay time dT1.

That is, the clock is synchronized with the delayed signal, and hence the phase of the clock is delayed with respect to the original signal.

FIG. 8B is a timing chart when a delay time is set in the second variable delay circuit 707. At this time, a minimum delay time is set in the first variable delay circuit 703.

When a second predetermined delay time dT2 is set in the second variable delay circuit 707, the phase of the delay clock signal VCOCLK_D is delayed with respect to the clock signal VCOCLK. When the loop including the phase comparator 102 is in the lock state, the phase of the delay clock signal VCOCLK_D matches the phase of the delay data signal DIN_D. The delay clock signal VCOCLK_D is obtained by providing the clock signal VCOCLK with the second delay time dT2. Therefore, when the loop including the phase comparator 102 is in the lock state, the phase of the clock signal VCOCLK with respect to the reception data signal DIN is advanced by the second delay time dT2.

That is, the signal is synchronized with the delayed clock, and hence the phase of the clock is advanced with respect to the original signal.

In this manner, also if the first variable delay circuit 703 and the second variable delay circuit 707 are inserted into the loop including the phase comparator 102, the phase adjustment can be realized. It should be noted that, in comparison with the case where the first variable delay circuit and the second variable delay circuit are inserted into the loop including the frequency phase comparator 104, it is necessary to increase the variable delay time of the first variable delay circuit 703 and the second variable delay circuit 707.

Fourth Embodiment

Entire Configuration of Data Transmission and Reception System

Figure 9:
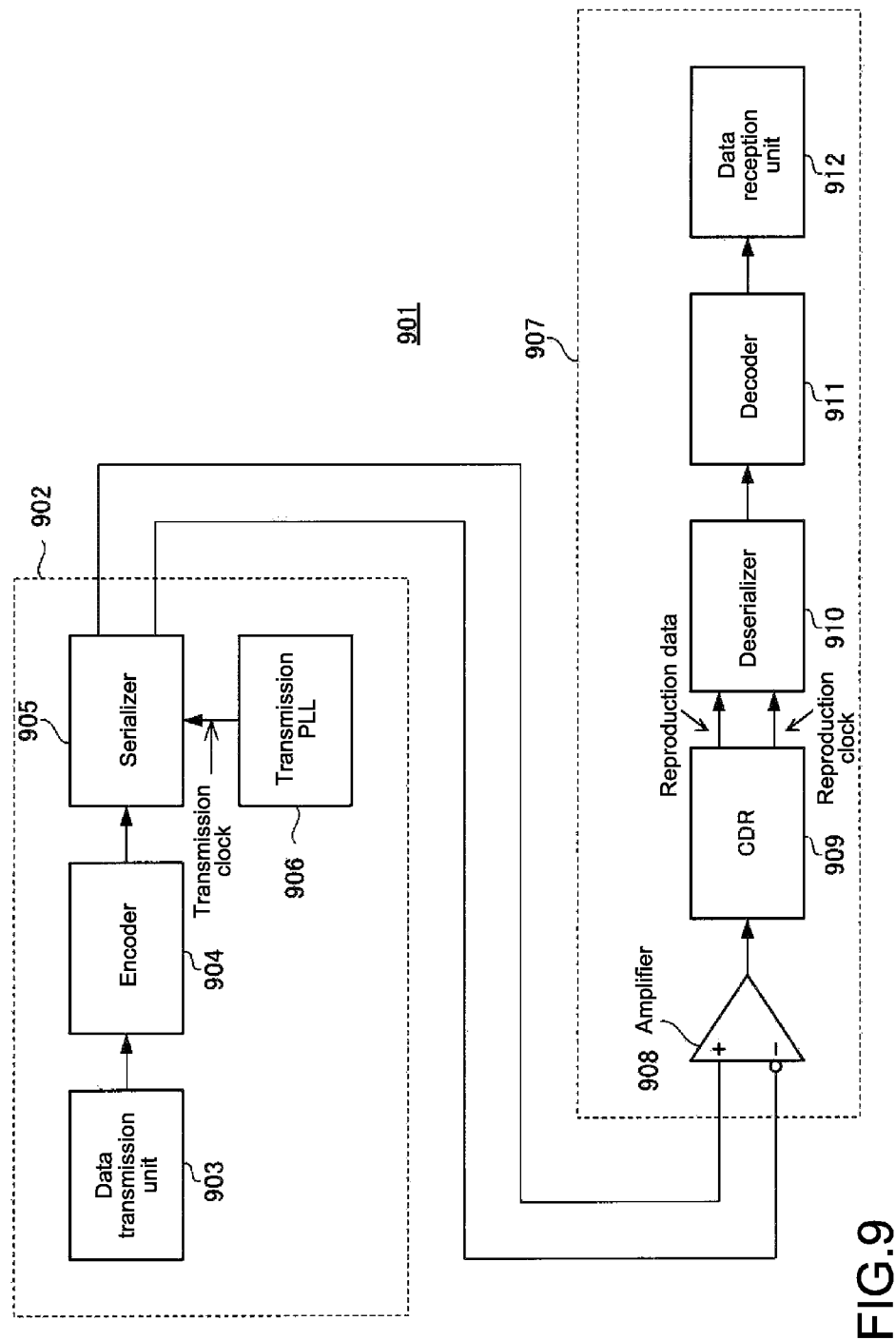
FIG. 9 is a block diagram of a data transmission and reception system according to a fourth embodiment of the present disclosure.

FIG. 9 is a block diagram of a data transmission and reception system 901 according to a fourth embodiment of the present disclosure.

A data transmission apparatus 902 includes a data transmission unit 903, an encoder 904, a serializer 905, and a transmission PLL 906.

Transmission data generated by the data transmission unit 903 is supplied to the encoder 904. The encoder 904 encodes data input from the data transmission unit 903 in an encode method that prevents a predetermined number of or more "0s" or "1s" from being continuous. Examples of the encode method may include 8b/10b encoding, 64b/66b encoding, eight to fourteen modulation (EFM), and 1-7 modulation.

The modulated data output from the encoder 904 is subjected to a parallel-serial conversion by the serializer 905. At this time, the serializer 905 uses a transmission clock output from the transmission PLL 906 to arrange the clock and the modulated data in time series according to a predetermined bit format, and outputs a data signal including the clock.

The data signal output by the data transmission apparatus 902 is received by a data reception apparatus 907.

The data reception apparatus 907 includes an amplifier 908, a CDR 909, a deserializer 910, a decoder 911, and a data reception unit 912.

The amplifier 908 amplifies a data signal of a differential input output by the serializer 905 to have an amplitude level that can be received by the CDR 909.

A data signal output by the amplifier 908 is input into the CDR 909. Any one of the CDRs according to the above-mentioned first, second, and third embodiments is employed as the CDR 909.

A reproduction data signal and a reproduction clock signal output from the CDR 909 are input into the deserializer 910. The deserializer 910 subjects the reproduction data signal to a serial-parallel conversion.

The modulated data output by the deserializer 910 is input into the decoder 911. The decoder 911 decodes (demodulates) the modulated data into data according to the encode system performed by the encoder 904. Then, the data demodulated by the decoder 911 is input into the data reception unit 912.

Although the data transmission and reception system 901 shown in FIG. 9 are differentially connected, single-phase connection may be used. In such a case, the amplifier 908 becomes unnecessary.

Although the data transmission apparatus 902 and the data reception apparatus 907 are connected through a signal line, a storage medium such as an optical disc may be provided instead of the signal line. In such a case, the data transmission apparatus 902 serves as a data recording apparatus and the data reception apparatus 907 serves as a data reproducing apparatus.

By adopting any one of the CDRs according to the above-mentioned first, second, and third embodiments as the CDR 909 of the data reception apparatus 907, the data reception apparatus 907 that is highly resistant to the fluctuation of the power-supply voltage and stably operated even with a low-voltage power-supply can be realized. In addition, the CDR 909 reduces the cost of the entire data transmission and reception system 901 and also contributes to increase the stability.

It should be noted that the present disclosure may also take the following configurations.

(1) A clock data recovery circuit, including:
an oscillator configured to output a clock signal;
a phase comparator configured to output a signal corresponding to a phase difference between an input reception data signal and the clock signal;
a divider configured to output a feedback clock signal obtained by dividing the clock signal by a predetermined division ratio;
a first variable delay circuit configured to output a delay data signal obtained by providing a first predetermined delay time to the reception data signal;
a second variable delay circuit configured to output a delay feedback clock signal obtained by providing a second predetermined delay time to the feedback clock signal;
a frequency phase comparator configured to output a signal corresponding to a frequency difference and a phase difference between the delay data signal and the delay feedback clock signal;
a lock detector configured to output a determination signal indicating whether or not the frequency difference and the phase difference between the delay data signal and the delay feedback clock signal are within a predetermined range; and
a multiplexer configured to receive the determination signal and select a signal of the phase comparator and a signal of the frequency phase comparator.

(2) The clock data recovery circuit according to Item (1), further including:
a first charge pump circuit that is connected to the multiplexer; and
a loop filter configured to smooth an output signal of the first charge pump circuit and supply the output signal to the oscillator, in which
the oscillator includes a voltage control oscillator.

(3) The clock data recovery circuit according to Item (2), in which
the first delay time and the second delay time are set, after the multiplexer is controlled to connect the frequency phase comparator to the first charge pump circuit, based on an output signal of the phase comparator, such that the phase difference between the reception data signal and the clock signal becomes minimum.

(4) The clock data recovery circuit according to Item (2), further including:
a second charge pump circuit that is connected to the divider; and
a control circuit configured to set the first delay time and the second delay time based on an output signal of the second charge pump circuit.

(5) A clock data recovery circuit, including:
an oscillator configured to output a clock signal;
a divider configured to output a feedback clock signal obtained by dividing the clock signal by a predetermined division ratio;
a frequency phase comparator configured to output a signal corresponding to a frequency difference and a phase difference between a reception data signal and the feedback clock signal;
a lock detector configured to output a determination signal indicating whether or not the frequency difference and the phase difference between the reception data signal and the feedback clock signal are within a predetermined range;
a first variable delay circuit configured to output a delay data signal obtained by providing a first predetermined delay time to the reception data signal;
a second variable delay circuit configured to output a delay clock signal obtained by providing a second predetermined delay time to the clock signal;
a phase comparator configured to output a signal corresponding to a phase difference between the delay data signal and the delay clock signal; and
a multiplexer configured to receive the determination signal and select a signal of the phase comparator and a signal of the frequency phase comparator.

(6) The clock data recovery circuit according to Item (5), further including:
a first charge pump circuit that is connected to the multiplexer; and
a loop filter configured to smooth an output signal of the first charge pump circuit and supply the output signal to the oscillator, in which
the oscillator includes a voltage control oscillator, and
the first delay time and the second delay time are set, after the multiplexer is controlled to connect the frequency phase comparator to the first charge pump circuit, based on an output signal of the phase comparator, such that a phase difference between the delay data signal and the delay clock signal becomes minimum.

(7) A data reception apparatus, including:
a clock data recovery circuit including
an oscillator configured to output a clock signal,
a phase comparator configured to output a signal corresponding to a phase difference between an input reception data signal and the clock signal,
a divider configured to output a feedback clock signal obtained by dividing the clock signal by a predetermined division ratio,
a first variable delay circuit configured to output a delay data signal obtained by providing the first predetermined delay time to the reception data signal,
a second variable delay circuit configured to output a delay feedback clock signal obtained by providing the second predetermined delay time to the feedback clock signal,
a frequency phase comparator configured to output a signal corresponding to a frequency difference and a phase difference between the delay data signal and the delay feedback clock signal,
a lock detector configured to output a determination signal indicating whether or not the frequency difference and the phase difference between the delay data signal and the delay feedback clock signal are within a predetermined range, and
a multiplexer configured to receive the determination signal and select a signal of the phase comparator and a signal of the frequency phase comparator;
a deserializer configured to perform serial-parallel conversion on the reception data signal using the clock signal; and
a decoder configured to decode modulated data output by the deserializer using the clock signal.

(8) The data reception apparatus according to Item (7), in which
the clock data recovery circuit further includes
a first charge pump circuit that is connected to the multiplexer, and
a loop filter configured to smooth an output signal of the first charge pump circuit and supply the output signal to the oscillator, and
the oscillator includes a voltage control oscillator, and
the first delay time and the second delay time are set, after the multiplexer is controlled to connect the frequency phase comparator to the first charge pump circuit, based on the output signal of the phase comparator, such that the phase difference between the reception data signal and the clock signal becomes minimum.

(9) The data reception apparatus according to Item (7), further including:
a second charge pump circuit that is connected to the divider; and
a control circuit configured to set the first delay time and the second delay time based on an output signal of the second charge pump circuit.

(10) A data transmission and reception system, including:
a data transmission apparatus configured to transmit serial data; and
a data reception apparatus including
a clock data recovery circuit including
an oscillator configured to output a clock signal,
a phase comparator configured to output a signal corresponding to a phase difference between an input reception data signal and the clock signal,
a divider configured to output a feedback clock signal obtained by dividing the clock signal by a predetermined division ratio,
a first variable delay circuit configured to output a delay data signal obtained by providing a first predetermined delay time to the reception data signal,
a second variable delay circuit configured to output a delay feedback clock signal obtained by providing a second predetermined delay time to the feedback clock signal,
a frequency phase comparator configured to output a signal corresponding to a frequency difference and a phase difference between the delay data signal and the delay feedback clock signal,
a lock detector configured to output a determination signal indicating whether or not the frequency difference and the phase difference between the delay data signal and the delay feedback clock signal are within a predetermined range, and
a multiplexer configured to receive the determination signal and select a signal of the phase comparator and a signal of the frequency phase comparator the determination signal,
a deserializer configured to perform serial-parallel conversion on the reception data signal using the clock signal, and
a decoder configured to decode modulated data output by the deserializer using the clock signal.

(11) The data transmission and reception system according to Item (10), in which
the clock data recovery circuit further includes
a first charge pump circuit that is connected to the multiplexer, and
a loop filter configured to smooth an output signal of the first charge pump circuit and supply the oscillator,
the oscillator includes a voltage control oscillator, and
the first delay time and the second delay time are set, after the multiplexer is controlled to connect the frequency phase comparator to the first charge pump circuit, based on the output signal of the phase comparator, such that the phase difference between the reception data signal and the clock signal becomes minimum.

(12) The data transmission and reception system according to Item (10), further including
a second charge pump circuit that is connected to the divider, and
a control circuit configured to set the first delay time and the second delay time based on an output signal of the second charge pump circuit.

In the embodiments of the present disclosure, the clock data recovery circuit has been disclosed.

In order to overcome the difference between the clock phase upon locking in the loop including the frequency phase comparator 104 and the clock phase upon locking in the loop including the phase comparator 102, which is caused due to the variation in the manufacturing process or the like, in the first embodiment, the first variable delay circuit 103 that provides the reception data signal DIN with the first delay time dT1 and the second variable delay circuit 107 that provides the feedback clock signal FBCLK with the second delay time dT2 are added to the loop including the frequency phase comparator 104. Further, in the third embodiment, the first variable delay circuit 703 that provides the reception data signal DIN with the first delay time dT1 and the second variable delay circuit 707 that provides the clock signal VCO-CLK with the second delay time dT2 are added to the loop including the phase comparator 102.

It is possible to reduce as much as possible the possibility that the loop filter voltage largely changes, and the oscillation frequency of the clock signal output by the voltage control oscillator 105 largely changes with the result that the lock is performed at an erroneous frequency or the lock is released when the CDR 101 transitions from the unlock state to the lock state in the state in which the power-supply voltage of the sophisticated information apparatus, digital apparatus, or the like fluctuates.

In addition, in the second embodiment, by adding the phase setting circuit 502 that automatically adjusts the first variable delay circuit 103 and the second variable delay circuit 107, the adjustment process at the time of shipment from a factory.

Further, in the fourth embodiment, by employing any one of the above-mentioned CDRs according to the first, second, and third embodiments as the CDR 909 of the data reception apparatus 907, the data reception apparatus 907 that is highly resistant to the fluctuation of the power-supply voltage and stably operated even with the low-voltage power-supply can be realized. In addition, the CDR 909 reduces the cost of the entire data transmission and reception system 901 and also contributes to increase the stability.

Hereinabove, the embodiments of the present disclosure have been described. However, the present disclosure is not limited to the above-mentioned embodiments and may include other modified examples and application examples without departing from the gist of the present disclosure described in scope of claims.

For example, the above-mentioned embodiments have described the apparatus and system in details and specifically for the purpose of easy understanding of the present disclosure, and are not necessarily limited to one having all the configurations described above. Alternatively, some of the configurations of one of the embodiments may be replaced by the configurations of other embodiments. The configuration of other embodiments may also be added to the configuration of one of the embodiments. Other configurations may be also added, deleted, or replaced with respect to some of the configurations of each of the embodiments.

Alternatively, some or all of the above-mentioned configurations, functions, processing units, and the like may be realized by hardware by designing them in an integrated circuit, for example. The above-mentioned configurations, functions, and the like may be realized by software for recognizing and executing programs for a processor that executes the functions. Information of programs, tables, files, and the like for realizing the functions may be stored in volatile or non-volatile storage such as a memory, a hard disk, and a solid state drive (SSD) or a recording medium such as an IC card and an optical disc.

Further, the control lines and information lines supposed to be necessary for the sake of description are shown, and not necessarily all of the control lines and information lines are shown for a product. In reality, it may be said that almost all of the configurations are mutually connected.

It should be understood by those skilled in the art that various modifications, combinations, sub-combinations and alterations may occur depending on design requirements and other factors insofar as they are within the scope of the appended claims or the equivalents thereof.

What is claimed is:

1. A clock data recovery circuit, comprising:
   an oscillator configured to output a clock signal;
   a phase comparator configured to output a signal corresponding to a phase difference between an input reception data signal and the clock signal;
   a divider configured to output a feedback clock signal obtained by dividing the clock signal by a predetermined division ratio;
   a first variable delay circuit configured to output a delay data signal obtained by providing a first predetermined delay time to the reception data signal, the first predetermined delay time being based on a first phase setting information;
   a second variable delay circuit configured to output a delay feedback clock signal obtained by providing a second predetermined delay time to the feedback clock signal, the second predetermined delay time being based on a second phase setting information;
   a frequency phase comparator configured to output a signal corresponding to a frequency difference and a phase difference between the delay data signal and the delay feedback clock signal;
   a lock detector configured to output a determination signal indicating whether or not the frequency difference and the phase difference between the delay data signal and the delay feedback clock signal are within a predetermined range; and
   a multiplexer configured to receive the determination signal and select a signal of the phase comparator and a signal of the frequency phase comparator.

2. The clock data recovery circuit according to claim 1, further comprising:
   a first charge pump circuit that is connected to the multiplexer; and
   a loop filter configured to smooth an output signal of the first charge pump circuit and supply the output signal to the oscillator, wherein
   the oscillator includes a voltage control oscillator.

3. The clock data recovery circuit according to claim 2, wherein
   the first delay time and the second delay time are set, after the multiplexer is controlled to connect the frequency phase comparator to the first charge pump circuit, based on the output signal of the phase comparator, such that the phase difference between the reception data signal and the clock signal becomes minimum.

4. The clock data recovery circuit according to claim 2, further comprising:
   a second charge pump circuit that is connected to the divider; and
   a control circuit configured to set the first delay time and the second delay time based on an output signal of the second charge pump circuit.

5. A clock data recovery circuit, comprising:
   an oscillator configured to output a clock signal;
   a divider configured to output a feedback clock signal obtained by dividing the clock signal by a predetermined division ratio;
   a frequency phase comparator configured to output a signal corresponding to a frequency difference and a phase difference between a reception data signal and the feedback clock signal;
   a lock detector configured to output a determination signal indicating whether or not the frequency difference and the phase difference between the reception data signal and the feedback clock signal are within a predetermined range;
   a first variable delay circuit configured to output a delay data signal obtained by providing a first predetermined delay time to the reception data signal, the first predetermined delay time being based on a first phase setting information;
   a second variable delay circuit configured to output a delay clock signal obtained by providing a second predetermined delay time to the clock signal, the second predetermined delay time being based on a second phase setting information;
   a phase comparator configured to output a signal corresponding to a phase difference between the delay data signal and the delay clock signal; and
   a multiplexer configured to receive the determination signal and select a signal of the phase comparator and a signal of the frequency phase comparator.

6. The clock data recovery circuit according to claim 5, further comprising:
   a first charge pump circuit that is connected to the multiplexer; and
   a loop filter configured to smooth an output signal of the first charge pump circuit and supply the output signal to the oscillator, wherein
   the oscillator includes a voltage control oscillator, and
   the first delay time and the second delay time are set, after the multiplexer is controlled to connect the frequency phase comparator to the first charge pump circuit, based on an output signal of the phase comparator, such that a phase difference between the delay data signal and the delay clock signal becomes minimum.

7. A data reception apparatus, comprising:
a clock data recovery circuit including
an oscillator configured to output a clock signal,
a phase comparator configured to output a signal corresponding to a phase difference between an input reception data signal and the clock signal,
a divider configured to output a feedback clock signal obtained by dividing the clock signal by a predetermined division ratio,
a first variable delay circuit configured to output a delay data signal obtained by providing the first predetermined delay time to the reception data signal, the first predetermined delay time being based on a first phase setting information,
a second variable delay circuit configured to output a delay feedback clock signal obtained by providing the second predetermined delay time to the feedback clock signal, the second predetermined delay time being based on a second phase setting information,
a frequency phase comparator configured to output a signal corresponding to a frequency difference and a phase difference between the delay data signal and the delay feedback clock signal,
a lock detector configured to output a determination signal indicating whether or not the frequency difference and the phase difference between the delay data signal and the delay feedback clock signal are within a predetermined range, and
a multiplexer configured to receive the determination signal and select a signal of the phase comparator and a signal of the frequency phase comparator;
a deserializer configured to perform serial-parallel conversion on the reception data signal using the clock signal; and
a decoder configured to decode modulated data output by the deserializer using the clock signal.

8. The data reception apparatus according to claim 7, wherein
the clock data recovery circuit further includes
a first charge pump circuit that is connected to the multiplexer, and
a loop filter configured to smooth an output signal of the first charge pump circuit and supply the output signal to the oscillator, and
the oscillator includes a voltage control oscillator, and
the first delay time and the second delay time are set, after the multiplexer is controlled to connect the frequency phase comparator to the first charge pump circuit, based on the output signal of the phase comparator, such that the phase difference between the reception data signal and the clock signal becomes minimum.

9. The data reception apparatus according to claim 7, further comprising:
a second charge pump circuit that is connected to the divider; and
a control circuit configured to set the first delay time and the second delay time based on an output signal of the second charge pump circuit.

10. A data transmission and reception system, comprising:
a data transmission apparatus configured to transmit serial data; and
a data reception apparatus including
a clock data recovery circuit including
an oscillator configured to output a clock signal,
a phase comparator configured to output a signal corresponding to a phase difference between an input reception data signal and the clock signal,
a divider configured to output a feedback clock signal obtained by dividing the clock signal by a predetermined division ratio,
a first variable delay circuit configured to output a delay data signal obtained by providing a first predetermined delay time to the reception data signal, the first predetermined delay time being based on a first phase setting information,
a second variable delay circuit configured to output a delay feedback clock signal obtained by providing a second predetermined delay time to the feedback clock signal, the second predetermined delay time being based on a second phase setting information,
a frequency phase comparator configured to output a signal corresponding to a frequency difference and a phase difference between the delay data signal and the delay feedback clock signal,
a lock detector configured to output a determination signal indicating whether or not the frequency difference and the phase difference between the delay data signal and the delay feedback clock signal are within a predetermined range, and
a multiplexer configured to receive the determination signal and select a signal of the phase comparator and a signal of the frequency phase comparator the determination signal,
a deserializer configured to perform serial-parallel conversion on the reception data signal using the clock signal, and
a decoder configured to decode modulated data output by the deserializer using the clock signal.

11. The data transmission and reception system according to claim 10, wherein
the clock data recovery circuit further includes
a first charge pump circuit that is connected to the multiplexer, and
a loop filter configured to smooth an output signal of the first charge pump circuit and supply the oscillator,
the oscillator includes a voltage control oscillator, and
the first delay time and the second delay time are set, after the multiplexer is controlled to connect the frequency phase comparator to the first charge pump circuit, based on the output signal of the phase comparator, such that the phase difference between the reception data signal and the clock signal becomes minimum.

12. The data transmission and reception system according to claim 10, further comprising
a second charge pump circuit that is connected to the divider, and
a control circuit configured to set the first delay time and the second delay time based on an output signal of the second charge pump circuit.

* * * * *